(No Model.) 3 Sheets—Sheet 1.

H. L. HOWSE.
OIL STOVE.

No. 338,842. Patented Mar. 30, 1886.

Witnesses,
Geo. H. Strong.
J. H. Howse.

Inventor,
H. L. Howse
By Davey & Co.
Attorneys (No Model.) 3 Sheets—Sheet 2.

H. L. HOWSE.
OIL STOVE.

No. 338,842. Patented Mar. 30, 1886.

Witnesses,
Geo. H. Strong
G. H. Howse

Inventor,
H. L. Howse
By Dewey & Co.
Attorneys (No Model.) 3 Sheets—Sheet 3.

H. L. HOWSE.
OIL STOVE.

No. 338,842. Patented Mar. 30, 1886.

Witnesses,
Geo. H. Strong.
G. H. Howse

Inventor,
H. L. Howse
By Dewey & Co.
Attorneys

UNITED STATES PATENT OFFICE.

HENRY L. HOWSE, OF SAN FRANCISCO, CALIFORNIA, ASSIGNOR OF ONE-HALF TO WILLIAM H. WIESTER, OF SAME PLACE.

OIL-STOVE.

SPECIFICATION forming part of Letters Patent No. 338,842, dated March 30, 1886.

Application filed May 12, 1884. Serial No. 131,246. (No model.)

*To all whom it may concern:*

Be it known that I, HENRY L. HOWSE, of the city of San Francisco, county of San Francisco, and State of California, have invented an Improvement in Oil-Stoves; and I hereby declare the following to be a full, clear, and exact description thereof.

My invention relates to certain improvements in oil-stoves, and has for its object to make them more effective in operation and more convenient in use.

It consists in certain details of construction, which will be more fully described by reference to the accompanying drawings, in which—

Figure 1:
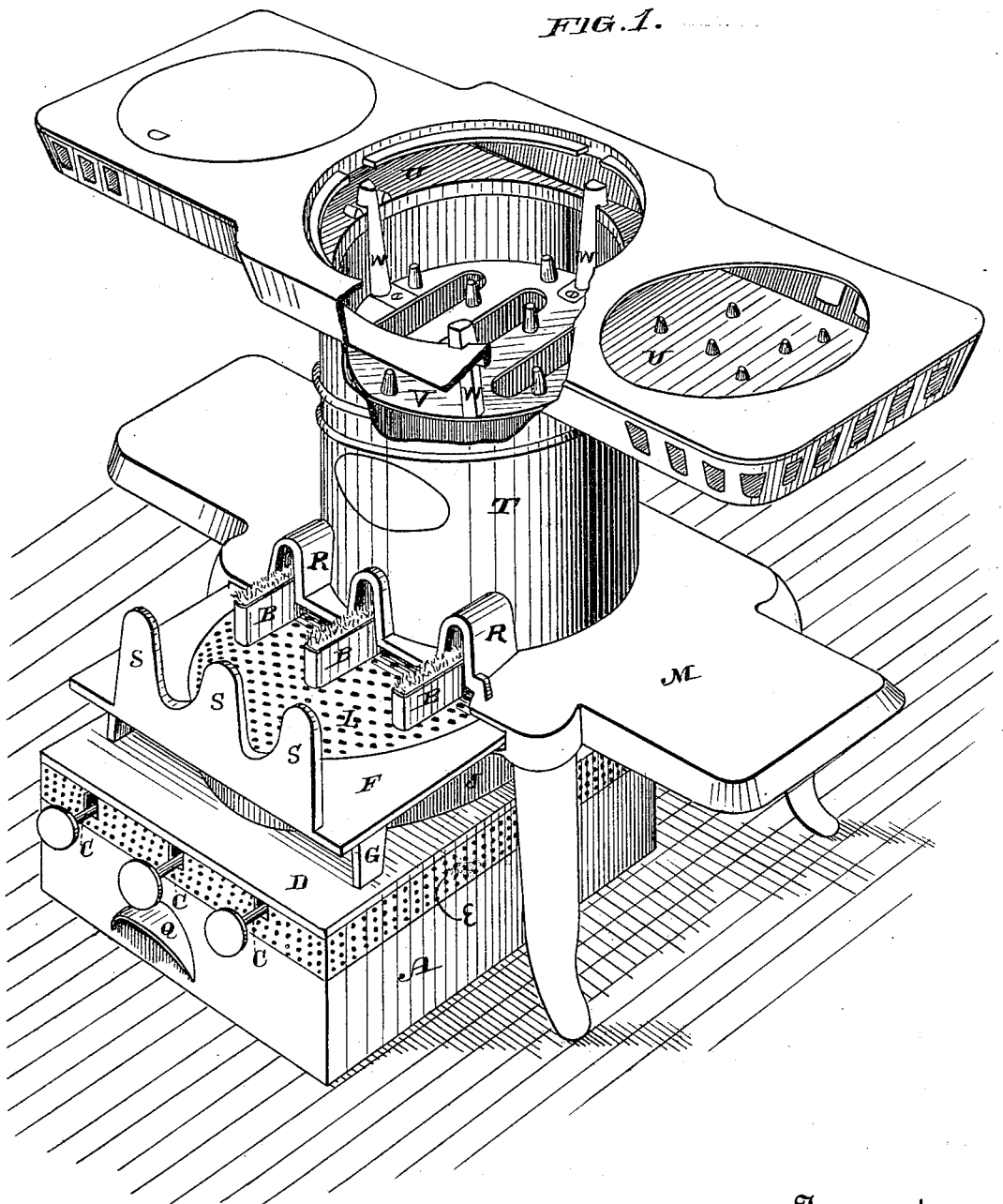
Figure 2:
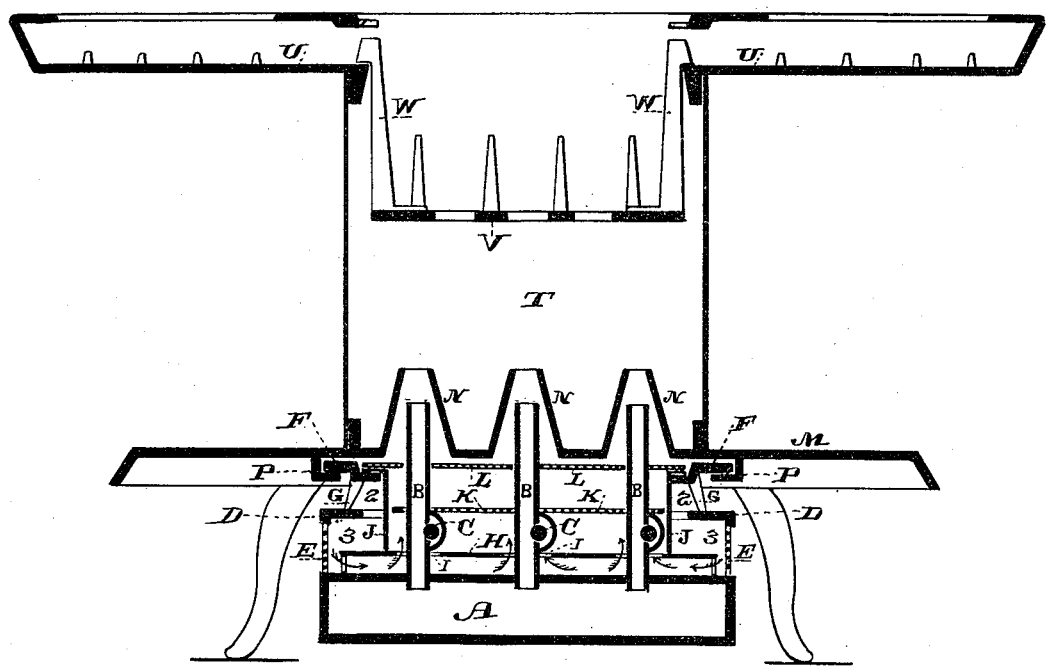
Figure 3:
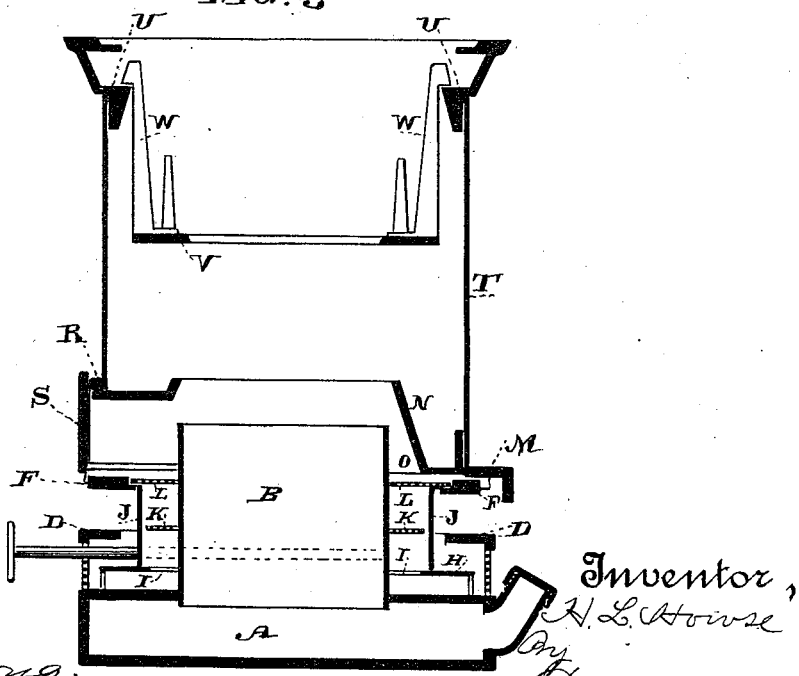
Figure 4:
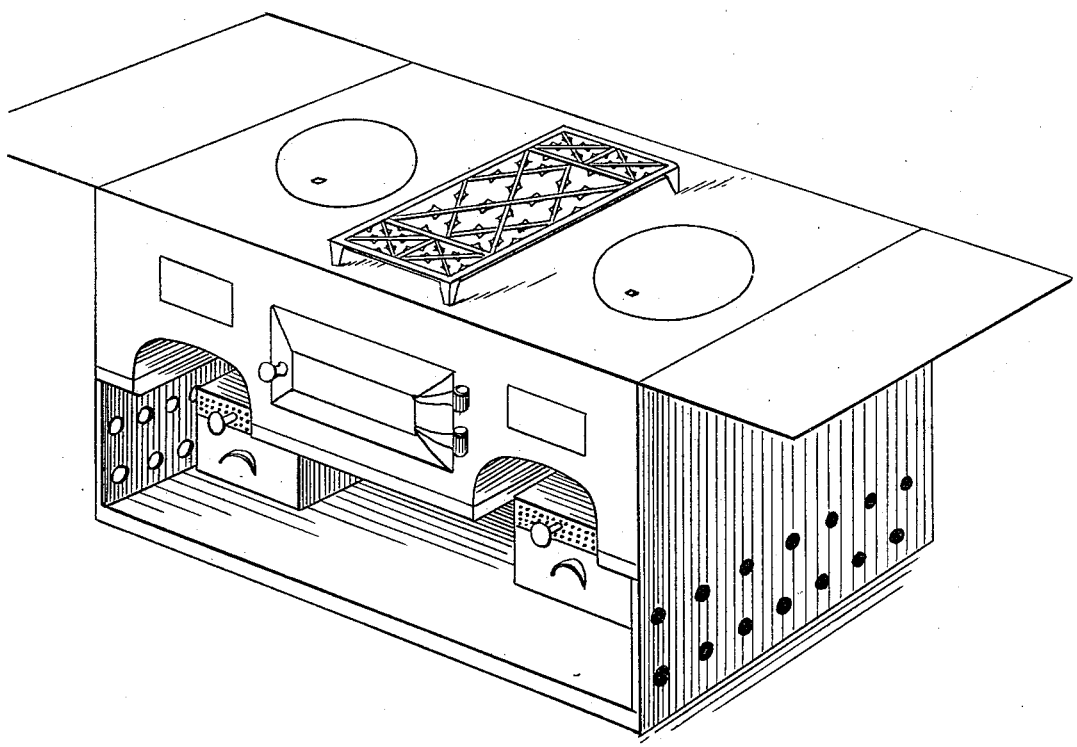

Figure 1 is a perspective view of my stove, showing the lamp partly withdrawn upon its guides. Fig. 2 is a vertical section taken through the stove and lamp transversely to the wick-tubes and cones. Fig. 3 is a vertical section taken in a plane lengthwise of the cones. Fig. 4 shows the application to a two-lamp range.

A is an oil-reservoir, having the customary wick-tubes, B, extending upward from the tops, and C are the shafts by which the ratchets are operated for raising and lowering the wicks.

D is a horizontal plate which is fixed a short distance above the top of the oil-reservoir, and the space between the edges of the plate and the upper edge of the reservoir is occupied by the foraminous sides E, which extend all the way around, forming a wall, through the perforations of which and beneath the plate D air must enter for the combustion of the oil. This current of air passing through the perforated tin keeps it cool and prevents the heat being conducted down to the oil-reservoir. Above the plate D a second plate, F, is supported upon standards G. A diaphragm, H, is supported a short distance above the top of the oil-reservoir and about midway between it and the plate D. This diaphragm has openings I, of considerable size, surrounding each of the wick-tubes, and the air which is drawn in through the vertical perforated wall and through the annular channel z z, formed between the plates D and F, passes into the annular chamber 3, Fig. 2, and passes beneath this diaphragm, and thence up through the passage I and alongside of the wick-tubes.

In order to prevent any air which passes through the perforated side E from coming in above the diaphragm H, and so forming a cross-current or disturbing the flames from the wick-tubes, and also to force the cold air closely on the top of oil-tank and up the sides of the wick-tubes to cool the oil-tank and wick-tubes, a circular ring or partition, J, is fitted into the corresponding circular opening in the plate F, and its lower edge rests upon the diaphragm H, thus cutting off any air which might pass through the partition E above the diaphragm H, or through the space between the plates D and F, and it forces all the air which enters for the combustion of the wick-tubes to pass up through the passage I around these tubes, as before described. This current of air keeps the top of the oil-reservoir and the other parts cool, and prevents the conduction of heat from the wick-tubes to these parts.

K is a circular perforated plate or disk which is set into the ring J, and has slots through which the wick-tubes extend upward, and L is a similar perforated plate which fits over the wick-tubes and rests upon the top of the ring J, and is about level with the top of the plate F. The perforated plate K and the perforated plate L serve to divide the space between diaphragm H and the top of the plate F within the ring J into two compartments, so that all currents which may arise will be broken up, and the air will be supplied to the wick-tubes in a steady equal current, which will not cause the flame to flare or smoke. They also prevent the heat radiated from the flame from striking the oil-reservoir.

The body of the stove consists of the cone-plate M, which may be of a size suitable for a single lamp, or for more, according to the purpose for which it is to be used. This cone-plate is cast in a single piece, and has cones N arising from its upper surface, with narrow slots at the top corresponding with the position of the wick-tubes from the lamp. These cones are made of a length considerably greater than the length of the top of the wick-tubes, with slots at the top wide enough to allow the flame of the wicks to pass through, while at the bottom the cones are of much greater diameter. In transverse section the sides of these cones form nearly or quite straight lines from the bottom to the contracted opening at the top. Openings O are made at the ends from the outside to the interior of the cones, for the purpose of admitting a certain amount of air at the ends, which tends to prevent the flame from extending up and smoking at the corners of the wicks. By this construction I am enabled to cut the wicks straight across the full length of the wick-tubes, and the corners need not be cut off to prevent smoking. The upper edges of the slots through the cones are made perfectly straight, instead of being arched or curved from one end to the other, thus producing a very even and perfect flame. The cone-plate M is supported at a suitable height by legs or sides which project downward, and this cone-plate has horizontal grooves or channels P, into which the edges of the plate F of the lamp may slide, so that the lamp will be supported from these curved guides, and the bottom will not rest upon the table or floor where the stove stands. The lamp has a handle, Q, on the front side, and by supporting it in the guides P, I am enabled to withdraw it from the cone-plate without its touching the floor, and it may be inserted so that the wick-tubes are always in the proper relative position with the openings through the cones through which the flame is to pass. When the lamp is in place beneath the cone-plate, the wick-tubes extend upward about half the height of the cones, and in order to allow the lamp to be inserted or withdrawn, continuations or extensions R are made toward the front and in line with the cone by being similar in depth and shape, so that the wick-tubes may pass out or into the cones when the lamp is to be removed or replaced.

Upon the plate F at the front side is cast or formed a flange or plate having vertical extensions S, which correspond with the conical extensions or openings R of the cones, so that when the lamp has been pushed into its place and the wick-tubes are in proper position beneath the cones these plates S will close the openings and prevent any entrance of air at these points.

By making the cone-plate in a single piece it will be manifest that the heat conveyed to it from the flame passing through the cones will heat it to a considerable distance upon each side of the cones, so that if used with a single lamp the sides of this plate may be extended beyond the chimney or body into which the flame passes, and will serve to keep vessels or articles hot which may be placed upon the extensions.

When made in the form of a range with two stoves near the ends, it will be seen that the central portion of the cone-plate between the two sets of cones will serve as the bottom of a heating-oven, which may be closed and serve for various purposes.

T is the body or chimney of my stove, which extends up a suitable height, and has a top, U, fixed to it, and it may extend as shown in Fig. 1, with holes for cooking-utensils. This top or extension has a circular central opening the size of the chimney, and within this opening is dropped the flame-guard V, which consists of a flat disk nearly fitting the diameter of the chimney, and having oval slots or openings corresponding with the cones and wick-tubes below. To the edges of this disk V are fixed arms W, which extend upward, and have hooks or projections at the top, which rest on the plate U around the edges of the central opening, and thus hold the flame-guards suspended at a point within the chimney. Short standards project upward from the upper surface of this flame-guard at different points, and serve to support vessels which it may be desired to heat at a short distance above the surface of the flame-guard. The heat from the wick-tubes passing up through the cones enters the chimney, strikes the flame-guard, and passes through the openings before described, and also around its edges, as it is not quite equal to the diameter of the interior of the chimney, and then passes up around the sides of the vessel which is being heated. The heat is thus kept in by the sides of the chimney, and reflected against the sides as well as the bottom of the vessel which is being heated, thus producing an intense heat which will rapidly cook anything which may be in the vessel. This flame-guard may be raised, lowered, adjusted, and removed at any time.

I am aware that it is not new to have the lamp adapted to be slid into and out of a recess for it, and also to have the lamp and cone-plate attached and adapted to slide in ways upon the stove, and I do not claim this construction, broadly.

I am also aware that it is old to close the openings (through which the wick-tubes pass when the lamp is being pushed into position) by means of plates fitting into them, and I wish to disclaim this broad construction.

In my Patent No. 271,463, granted January 30, 1883, I have shown lugs adapted to enter the slots or grooves in which the wick-tubes move, for the purpose of filling those grooves and preventing access of air, and I do not herein claim, broadly, an obstruction carried upon the lamp and adapted to close such a groove. My present invention differs in respect to this point both in construction and effect from that of my said patent. Where the lugs in said patent enter the grooves it will be apparent that a very accurate fit is required both of the lugs and to the grooves, and in respect to the location of the lugs upon the lamp any lateral displacement preventing the lugs from entering, and this makes it a matter of some care to insert the lamp, and if there be any failure in the fit or opening or indentation of the sheet metal which forms the groove the accuracy of fit will be destroyed and a passage be left, even if the bars are admitted. In my present invention a single plate serves the purpose of the four bars in my said patent, and as the vertical projections are of plain sheet metal they close the projecting ends of the conical arches when they abut against them, without regard to any slight lateral movement of the lamp in its guides as it is pushed in.

Having thus described my invention, what I claim as new, and desire to secure by Letters Patent, is—

1. In a lamp, and in combination, the oil-reservoir, with a horizontal plate, D, the surrounding foraminous sides, the plate F, with the ring J extending downward, and forming the air passage or chamber 3, and the diaphragm H, having air-spaces around the wick-tubes and fitted closely against the bottom of the diaphragm.

2. An oil-reservoir with horizontal plates D and F secured at intervals above it, a surrounding foraminous partition inclosing the space between the top of the oil-reservoir and the plate D, a horizontal diaphragm, H, between which and the top of the lamp a current of air is drawn, openings through which the air passes up beside the wick-tubes, an inclosing-ring, J, extending from the diaphragm to the top of the plate F, forming the air-passage 3, and the foraminous diaphragms K and L, situated within the ring and above the diaphragm, as herein described.

3. In a stove, the oil-reservoir with its wick-tubes, the horizontal plates D and F, and diaphragm H, and the ring J, extending from the plate F to H, through the plate D, and forming openings or air-passages 2 3, to admit air to cool the parts, as herein described.

4. In an oil-stove, the cone-plate, the body or chimney T, resting thereon, the slotted cones corresponding to the position of the wick-tubes, and the horizontal portions M, extending to each side beyond the chimney, said cone-plate and extensions M being cast in one piece, as described.

5. In combination, the cone-plate having upwardly-extending cones provided with conical arches extending from the cones, and communicating with the interior thereof and the front of the plate M through the cylindrical body, suitable guides on the under side of said plate for suspending the plate F, the lamp, the wick-tubes carried thereby, and the vertical projections S on the front of the plate F, corresponding with and fitting against the open ends of the arches when the lamp is in place, substantially as described.

6. The combination of the wick-tubes and cones of an oil-stove, the body surrounding said wick-tubes and cones and extending upward from the base, a slotted flame-guard and hooked arms, and a shoulder on the upper edge of the body to receive and support the hooked arms of the flame-guard, substantially as described.

In witness whereof I have hereunto set my hand.

HENRY L. HOWSE.

Witnesses:
S. H. NOURSE,
J. H. BLOOD.